(12) United States Patent
Hogan et al.

(10) Patent No.: US 8,063,165 B2
(45) Date of Patent: Nov. 22, 2011

(54) FUNCTIONAL POLYMERS PREPARED WITH SULFUR-CONTAINING INITIATORS

(75) Inventors: Terrence E. Hogan, Akron, OH (US); William L. Hergenrother, Akron, OH (US)

(73) Assignee: Bridgestone Corporation, Akron, OH (US)

( * ) Notice: Subject to any disclaimer, the term of this patent is extended or adjusted under 35 U.S.C. 154(b) by 576 days.

(21) Appl. No.: 12/139,567

(22) Filed: Jun. 16, 2008

(65) Prior Publication Data
US 2008/0308204 A1 Dec. 18, 2008

Related U.S. Application Data

(60) Provisional application No. 60/936,071, filed on Jun. 18, 2007.

(51) Int. Cl.
C08F 36/04 (2006.01)
C08F 4/48 (2006.01)

(52) U.S. Cl. ........ 526/335; 526/173; 526/178; 526/180; 526/181; 526/340; 525/105; 525/272; 525/313; 525/370; 525/371; 525/375

(58) Field of Classification Search .................. 526/335, 526/173, 178, 180, 181, 340; 525/105, 272, 525/313, 370, 371, 375
See application file for complete search history.

(56) References Cited

U.S. PATENT DOCUMENTS

| | | | |
|---|---|---|---|
| 3,109,871 A | 11/1963 | Zalinski et al. |
| 3,135,716 A | 6/1964 | Uraneck et al. |
| 4,429,091 A | 1/1984 | Hall |
| 4,519,431 A | 5/1985 | Yoshimura et al. |
| 4,540,744 A | 9/1985 | Oshima et al. |
| 4,603,722 A | 8/1986 | Oshima et al. |
| 4,616,069 A | 10/1986 | Watanabe et al. |
| 4,677,165 A | 6/1987 | Kikuchi et al. |
| 4,929,679 A | 5/1990 | Akita et al. |
| 5,109,907 A | 5/1992 | Stayer et al. |
| 5,115,035 A | 5/1992 | Shiraki et al. |
| 5,210,145 A | 5/1993 | Lawson et al. |
| 5,219,942 A | 6/1993 | Suzuki et al. |
| 5,227,431 A | 7/1993 | Lawson et al. |
| 5,248,722 A | 9/1993 | DeTrano et al. |
| 5,268,439 A | 12/1993 | Hergenrother et al. |
| 5,329,005 A | 7/1994 | Lawson et al. |
| 5,332,810 A | 7/1994 | Lawson et al. |
| 5,349,024 A | 9/1994 | Hergenrother et al. |
| 5,496,940 A | 3/1996 | Lawson et al. |
| 5,502,129 A | 3/1996 | Hergenrother et al. |
| 5,552,473 A | 9/1996 | Lawson et al. |
| 5,786,441 A | 7/1998 | Lawson et al. |
| 5,877,336 A | 3/1999 | Hergenrother et al. |
| 5,902,856 A | 5/1999 | Suzuki et al. |
| 5,916,976 A | 6/1999 | Kerns et al. |
| 5,935,893 A | 8/1999 | Lawson et al. |
| 6,359,167 B2 | 3/2002 | Toone et al. |
| 6,596,798 B1 | 7/2003 | Rademacher et al. |
| 2006/0178467 A1 | 8/2006 | Fukushima et al. |
| 2007/0149744 A1 | 6/2007 | Yan et al. |
| 2007/0293620 A1 | 12/2007 | Yan et al. |

FOREIGN PATENT DOCUMENTS

| | | | |
|---|---|---|---|
| WO | WO 2004/020475 A1 | 3/2004 |
| WO | WO 2004/041870 A1 | 5/2004 |
| WO | WO 2004/041870 A2 * | 5/2004 |

OTHER PUBLICATIONS

F. G. Bordwell, Harry M. Andersen, and Burnett M. Pitt, "The Reaction of Thiacyclopropanes (Olefin Sulfides) and Thiacyclobutanes with Organolithium Compounds," J. Am. Chem. Soc., 1954, 76, (4), pp. 1082-1085.

A. Mordini and M. Taddei, "Preparation of beta- and gamma-Trialkylstannyl Alcohols and Thiols by Ring Opening of Oxiranes, Oxetanes, Thiiranes, and Thietanes with Trimethylstannyllithium", Gazzetta Chimica Italiana 116, 1986, pp. 239-242.

A. Sanchez et al., "Solution properties and chain dimensions of poly(trimethylene sulfide)", Makromol. Chem. 189, 1988, pp. 399-408.

Edward J. Panek and George M. Whitesides, "Free radical intermediates in the reaction of neophyllithium with oxygen," J. Am. Chem. Soc., 1972, 94, (25), pp. 8768-8775.

Claims 1-18 of co-pending U.S. Appl. No. 11/189,891 entitled "Functionalized Polymers and Improved Tires Therefrom", filed Jul. 26, 2005.

* cited by examiner

*Primary Examiner* — Robert D. Harlan
(74) *Attorney, Agent, or Firm* — Meredith E. Hooker; Arthur M. Reginelli

(57) ABSTRACT

A method for forming a polymer including a sulfur-containing functional group, the method comprising introducing a sulfur-containing initiator defined by the formula

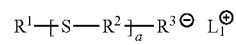

with conjugated diene monomer and optionally copolymerizable monomer within a polymerization medium and allowing the sulfur-containing initiator to initiate the polymerization of the conjugated diene monomer and the optional copolymerizable monomer, where $R^1$ is a monovalent organic group, $R^2$ is a divalent organic group, $R^3$ is a divalent organic group or a bond, and a is an integer from 1 to about 5.

18 Claims, No Drawings

FUNCTIONAL POLYMERS PREPARED WITH SULFUR-CONTAINING INITIATORS

This application claims the benefit of U.S. Provisional Application No. 60/936,071, filed in Jun. 18, 2007, which is incorporated herein by reference.

FIELD OF THE INVENTION

One or more embodiments of the present invention are directed toward functional polymers and methods for producing functional polymers by employing anionic polymerization techniques and sulfur-containing initiators.

BACKGROUND OF THE INVENTION

Anionic polymerization techniques have been used to synthesize polymers that are useful in the manufacture of tires. Using these techniques, certain organometallic compounds can be used to initiate the polymerization of monomer such as conjugated diene monomer. Due to the mechanism by which the initiation and polymerization proceeds, the organometallic compound adds to monomer to form a polymer chain wherein the organo substituent of the initiator is attached as the head group of the polymer. Common initiators include organo lithium species such as n-butyl lithium.

Certain initiators impart a functional group to the polymer. These functional groups may include a heteroatom or metal that can have a desirable impact on the polymer or compositions containing the polymer. For example, where the polymers are employed in the manufacture of tire treads, the functional group can lower the hysteresis loss of the tread vulcanizate. This lowering of hysteresis loss may result from interaction between the functional group and the filler, although other mechanisms have also been proposed.

Tributyl tin lithium compounds have been used to initiate conjugated dienes (optionally together with copolymerizable monomer) to form vulcanizable polymers (i.e., rubber) that, when used in treads, has a desirable impact on the performance of the tread. Likewise, lithiated cyclic imines (e.g., lithio hexamethyleneimine) have also been used to initiate the polymerization of similar polymers and provide rubber with desirable performance in tire treads. Still other examples include lithiated thioacetals (e.g., 2-lithio-1,3-dithianes).

The selection of useful initiator compounds, however, is not trivial. This is especially true where there is a desire to select initiator compounds that have a desirable impact on filled rubber compositions or vulcanizates, such as tire treads. Indeed, the prior art only includes a few types of compounds that are useful. This difficulty derives from several factors. For example, the anionic polymerization of conjugated dienes is sensitive, and many compounds or substituents can poison the polymerization system. And, the selection of substituents or functional groups that can impact filled compositions, such as tire treads, is difficult to predict.

Because functional initiators remain desirable, particularly for the synthesis for functionalized polymers that are used in the manufacture of tires, there is a continued desire to identify initiators that can lead to technologically useful polymers and that have desirable impact on filled rubber compositions and/or vulcanizates.

SUMMARY OF THE INVENTION

One or more embodiments of the present invention provide a method for forming a polymer including a sulfur-containing functional group, the method comprising introducing a sulfur-containing initiator defined by the formula

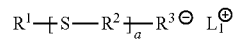

with conjugated diene monomer and optionally copolymerizable monomer within a polymerization medium and allowing the sulfur-containing initiator to initiate the polymerization of the conjugated diene monomer and the optional copolymerizable monomer, where $R^1$ is a monovalent organic group, $R^2$ is a divalent organic group, $R^3$ is a divalent organic group or a bond, and a is an integer from 1 to about 5.

One or more embodiments of the present invention also provides method for preparing a polymer including a sulfur-containing functional group, the method comprising (i) introducing an organolithium compound with a cyclic sulfur-containing compound defined by the formula

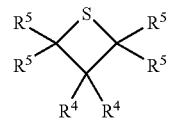

within a reaction medium at a temperature below 0° C. and allowing the organolithium and cyclic sulfur-containing compound to react and form a precursor compound, where each $R^4$ and $R^5$ are independently hydrogen or a monovalent organic group, and (ii) introducing the precursor compound to monomer to be polymerized.

One or more embodiments of the present invention further provides a method for preparing a sulfur-containing anionic polymerization initiator, the method comprising (i) introducing an organolithium compound with a cyclic sulfur-containing compound defined by the formula

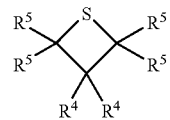

within a reaction medium at a temperature below 0° C. and allowing the organolithium and cyclic sulfur-containing compound to react and form a precursor compound, where each $R^4$ and $R^5$ are independently hydrogen or a monovalent organic group, and (ii) introducing the precursor with at least one mole of a conjugated diene monomer prior to allowing the temperature of the reaction medium to increase above 0° C. and allowing the precursor compound to react with the conjugated diene monomer to form a sulfur-containing anionic polymerization initiator.

One or more embodiments of the present invention also provides a sulfur-containing anionic polymerization initiator defined by the formula

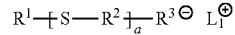

where $R^1$ is a monovalent organic group, $R^2$ is a divalent organic group, $R^3$ is a divalent organic group or a bond, and a is an integer from 1 to about 5.

One or more embodiments of the present invention still further provides a polymer including a sulfur-containing functional group, where the polymer is defined by the formula:

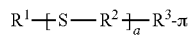

where $R^1$ is a monovalent organic group, $R^2$ is a divalent organic group, $R^3$ is a divalent organic group or a bond, a is an integer from 1 to about 5, and 7 is a polymer chain.

DETAILED DESCRIPTION OF ILLUSTRATIVE EMBODIMENTS

Functional polymers of one or more embodiments of the present invention, which are particularly useful for preparing tire treads, may be defined by the formula

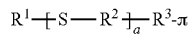

where $R^1$ is a monovalent organic group, $R^2$ is a divalent organic group, $R^3$ is a divalent organic or a bond, a is an integer from 1 to about 5, and 7 is a polymer chain. As those skilled in the art appreciate, the brackets represent linear repeat units of the group $—S—R^2—$. In certain embodiments, a is an integer from 1 to 3, in other embodiments a is an integer from 1 to 2, and in other embodiments a is 1.

In one or more embodiments, the monovalent organic groups may include hydrocarbyl groups or substituted hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, boron, oxygen, silicon, sulfur, and phosphorus atoms.

In one or more embodiments, divalent organic groups may include a hydrocarbylene group or substituted hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to about 20 carbon atoms. Substituted hydrocarbylene group includes a hydrocarbylene group in which one or more hydrogen atoms have been replaced by a substituent such as an alkyl group. The divalent organic groups may also contain one or more heteroatoms such as, but not limited to, nitrogen, oxygen, boron, silicon, sulfur, and phosphorus atoms. In one or more embodiments, the divalent organic group will not react with a living polymer.

In particular embodiments, $R^1$ is an alkyl group including from 1 to about 10 carbon atoms, in other embodiments from about 2 to about 6 carbon atoms, in other embodiments from about 3 to about 5 carbon atoms, and in other embodiments it includes 4 carbon atoms. In particular embodiments, $R^1$ includes a t-butyl group, in other embodiments includes a n-butyl group, and in other embodiments includes a sec-butyl group. In other embodiments, $R^1$ is an aryl group including from 6 to 12 carbon atoms and in other embodiments from 6 to 8 carbon atoms. In particular embodiments, $R^1$ is a phenyl group.

In these or other particular embodiments, $R^2$ is an alkylene or substituted alkylene group including from 3 to about 10 carbon atoms, in other embodiments from 3 to about 6 carbon atoms, and in other embodiments from 3 to 4 carbon atoms. Substituted groups include those groups where one or more of the hydrogen atoms are replaced by a monovalent organic group. In certain embodiments, $R^2$ is a linear propylene group. In certain embodiments, $R^2$ is a substituted propylene group.

In one or more embodiments, $R^3$ is the oligomerization product of from 1 to about 10 moles of conjugated diene monomer optionally together with copolymerizable monomer. Conjugated diene monomers include, for example, $C_4$-$C_{12}$ conjugated dienes. In other embodiments, $R^3$ is the oligomerization product of from 1 to about 5, or in other embodiments from about 1 to about 3 moles of conjugated diene. Exemplary copolymerizable monomers include $C_8$-$C_{18}$ monovinyl aromatic monomer.

In particular embodiments, the functional polymers may be defined by the formula

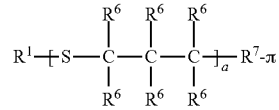

where $R^1$ is a monovalent organic group, each $R^6$ is independently a hydrogen atom or a monovalent organic group, a is an integer from 1 to about 5, and $R^7$ is the oligomerization product of diene monomer optionally together with copolymerizable monomer.

In one or more embodiments, the polymer chain (B) of the functionalized polymer includes an unsaturated polymer. In these or other embodiments, the polymer chain is a rubber polymer, which refers to a polymer that can be vulcanized. The polymer chain substituent can have a mid-point glass transition temperature ($T_g$) that is less than 0° C., in other embodiments less than –20° C., and in other embodiments less than –30° C. In one embodiment, the rubbery polymer chain exhibits a single glass transition temperature.

Included are anionically polymerized polymers. Examples include polybutadiene, polyisoprene, poly(styrene-co-butadiene), poly(styrene-co-butadiene-co-isoprene), poly(isoprene-co-styrene), and poly(butadiene-co-isoprene).

In one or more embodiments, the polymer chain has a number average molecular weight ($M_n$) of from about 5 to about 1,000 kg/mole, in other embodiments from about 50 to about 500 kg/mole, and in other embodiments 100 to about 300 kg/mole, as measured by using Gel Permeation Chromatography (GPC) calibrated with polystyrene standards and adjusted for the Mark-Houwink constants for the polymer in question.

In one or more embodiments, the functional polymer of the present invention also includes a second functional group Ω. In particular embodiments, this functional polymer may be defined by the formula

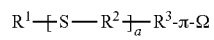

where $R^1$ is a monovalent organic group, $R^2$ is a divalent organic group, $R^3$ is a divalent organic or a bond, a is an integer from 1 to about 5, and $\pi$ is a polymer chain, and where $\Omega$ includes a functional group. In one or more embodiments, the functional group includes a heteroatom. In one or more embodiments, the functional group $\Omega$ reduces the 50° C. hysteresis loss of vulcanizates including the functionalized polymer when compared to similar vulcanizates with polymer not including the functional group $\Omega$ (i.e., a comparable polymer without $\Omega$). In one or more embodiments, this reduction in hysteresis loss is at least 5%, in other embodiments at least 10%, and in other embodiments at least 15%. In certain embodiments, this reduction in the 50° C. hysteresis loss occurs within carbon black filled vulcanizates, in other embodiments the reduction occurs within silica-filled vulcanizates, and in other embodiments the reduction occurs in vulcanizates that include a blend of silica and carbon black as filler. In one or more embodiments, the heteroatom-bearing substituents include those groups that may generally be characterized as electron rich species or metal-containing species. In these or other embodiments, the functional group reacts or interacts with rubber or rubber fillers or otherwise has a desirable impact on filled rubber compositions or vulcanizates.

In one or more embodiments, the functional polymer may be prepared by using a novel anionic polymerization initiator to polymerize conjugated diene monomer, optionally together with copolymerizable monomer. The initiator imparts a functional group at the head of the polymer (i.e., site of initiation). This polymerization may take place by employing conventional anionic polymerization techniques and/or mechanisms. In one or more embodiments, the polymerization occurs within a solvent. The process results in a living polymer that can be protonated or further functionalized.

Monomer that can be polymerized by the initiator compounds of the present invention include any monomer capable of being polymerized according to anionic polymerization techniques. These monomers include those that lead to the formation of elastomeric homopolymers or copolymers. Suitable monomers include, without limitation, conjugated $C_4$-$C_{12}$ dienes (optionally together with $C_8$-$C_{18}$ monovinyl aromatic monomers) and $C_6$-$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, ⌈-methylstyrene, p-methylstyrene, and vinylnaphthalene. When preparing elastomeric copolymers, such as those containing conjugated diene monomers and aromatic vinyl monomers, the conjugated diene monomers and aromatic vinyl monomers are normally used at a ratio of 95:5 to 50:50, and preferably 95:5 to 65:35.

The amount of initiator employed in conducting anionic polymerizations can vary widely based upon the desired polymer characteristics. In one or more embodiments, from about 0.1 to about 100, in other embodiments from about 0.33 to about 10, and in other embodiments from about 0.2 to 1.0 mmol of lithium per 100 g of monomer is employed.

The polymerization processes of this invention may be conducted in non-polar solvents and mixtures of non-polar solvents with polar-solvents including those discussed above. In order to promote randomization in copolymerization and to control vinyl content, a polar coordinator may be added to the polymerization ingredients. Amounts may range between 0 and 90 or more equivalents per equivalent of lithium. The amount may depend on the amount of vinyl desired, the level of styrene employed and the temperature of the polymerization, as well as the nature of the specific polar coordinator (modifier) employed. Suitable polymerization modifiers include ethers or amines to provide the desired microstructure and randomization of the comonomer units.

Compounds useful as polar coordinators include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Specific examples of compounds useful as polar coordinators include tetrahydrofuran (THF), linear and cyclic oligomeric oxolanyl alkanes such as 2,2-bis (2'-tetrahydrofuryl) propane, di-piperidyl ethane, dipiperidyl methane, hexamethylphosphoramide, N-N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, incorporated herein by reference.

By reacting anionic initiators according to this reaction with certain unsaturated monomers, a living polymer is propagated into a polymeric structure. Throughout formation and propagation of the polymer, the polymeric structure may be anionic and "living." A new batch of monomer subsequently added to the reaction can add to the living ends of the existing chains and increase the degree of polymerization. A living polymer, therefore, includes a polymeric segment having a living or reactive end. Anionic polymerization is further described in George Odian, *Principles of Polymerization*, ch. 5 ($3^{rd}$ Ed. 1991), or Panek, 94 J. Am. Chem. Soc., 8768 (1972), which are incorporated herein by reference.

Anionically polymerized living polymers can be prepared by either batch or continuous methods. A batch polymerization is begun by charging a blend of monomer(s) and normal alkane solvent to a suitable reaction vessel, followed by the addition of the polar coordinator (if employed) and an initiator compound. The reactants may be heated to a temperature of from about 20 to about 130° C. and the polymerization may be allowed to proceed for from about 0.1 to about 24 hours. This reaction produces a reactive polymer having a reactive or living end. In one or more embodiments, at least about 30% of the polymer molecules contain a living end, in other embodiments at least about 50% of the polymer molecules contain a living end, and in other embodiments at least about 80% contain a living end.

The living polymer can be protonated or subsequently functionalized or coupled. Protonation can occur by the addition of any compound that can donate a proton to the living end. Examples include water, isopropyl alcohol, and methyl alcohol.

In one or more embodiments, the living polymer can be terminated with a compound that will impart a functional group to the terminus of the polymer. Useful functionalizing agents include those conventionally employed in the art. Types of compounds that have been used to end-functionalize living polymers include carbon dioxide, benzophenones, benzaldehydes, imidazolidones, pyrrolidinones, carbodiimides, ureas, isocyanates, and Schiff bases including those disclosed in U.S. Pat. Nos. 3,109,871, 3,135,716, 5,332,810, 5,109,907, 5,210,145, 5,227,431, 5,329,005, 5,935,893, which are incorporated herein by reference. Specific examples include trialkyltin halides such as tributyltin chloride, as disclosed in U.S. Pat. Nos. 4,519,431, 4,540,744, 4,603,722, 5,248,722, 5,349,024, 5,502,129, and 5,877,336, which are incorporated herein by reference. Other examples include cyclic amino compounds such as hexamethyleneimine alkyl chloride, as disclosed in U.S. Pat. Nos. 5,786,441, 5,916,976 and 5,552,473, which are incorporated herein by reference. Other examples include N-substituted aminoketones, N-substituted thioaminoketones, N-substituted aminoaldehydes, and N-substituted thioaminoaldehydes, including N-methyl-2-pyrrolidone or dimethylimidazolidinone (i.e., 1,3-dimethylethyleneurea) as disclosed in U.S. Pat. Nos. 4,677,165, 5,219,942, 5,902,856, 4,616,069, 4,929,679, 5,115,035, and 6,359,167, which are incorporated herein by reference. Additional examples include cyclic sulfur-containing or oxygen containing azaheterocycles such as disclosed in WO 2004/020475, U.S. Ser. No. 60/644,164 and U.S. Pat. No. 6,596,798, which are incorporated herein by reference. Other examples include boron-containing terminators such as disclosed in U.S. Ser. No. 60/591,065, which is incorporated herein by reference. Still other examples include cyclic siloxanes such as hexamethylcyclotrisiloxane, including those disclosed in copending U.S. Ser. No. 60/622,188, which is incorporated herein by reference. Further, other examples include α-halo-ω-amino alkanes, such as 1-(3-bromopropyl)-2,2,5,5-tetramethyl-1-aza-2,5-disilacyclopentane, including those disclosed in copending U.S. Ser. Nos. 60/624,347 and 60/643,653, which are incorporated herein by reference.

In one or more embodiments, the living polymer can be coupled to link two or more living polymer chains together. In certain embodiments, the living polymer can be treated with both coupling and functionalizing agents, which serve to couple some chains and functionalize other chains. The combination of coupling agent and functionalizing agent can be used at various molar ratios. Although the terms coupling and functionalizing agents have been employed in this specification, those skilled in the art appreciate that certain compounds may serve both functions. That is, certain compounds may both couple and provide the polymer chains with a functional group. Those skilled in the art also appreciate that the ability to couple polymer chains may depend upon the amount of coupling agent reacted with the polymer chains. For example, advantageous coupling may be achieved where the coupling agent is added in a one to one ratio between the equivalents of lithium on the initiator and equivalents of leaving groups (e.g., halogen atoms) on the coupling agent.

Exemplary coupling agents include metal halides, metalloid halides, alkoxysilanes, and alkoxystannanes.

In one or more embodiments, useful metal halides or metalloid halides may be selected from the group comprising compounds expressed by the formula (1) $R^1_n M^1 X_{4-n}$, the formula (2) $M^1 X_4$, and the formula (3) $M^2 X_3$, where $R^1$ is the same or different and represents a monovalent organic group with carbon number of 1 to about 20, $M^1$ in the formulas (1) and (2) represents a tin atom, silicon atom, or germanium atom, $M^2$ represents a phosphorous atom, X represents a halogen atom, and n represents an integer of 0-3.

Exemplary compounds expressed by the formula (1) include halogenated organic metal compounds, and the compounds expressed by the formulas (2) and (3) include halogenated metal compounds.

In the case where $M^1$ represents a tin atom, the compounds expressed by the formula (1) can be, for example, triphenyltin chloride, tributyltin chloride, triisopropyltin chloride, trihexyltin chloride, trioctyltin chloride, diphenyltin dichloride, dibutyltin dichloride, dihexyltin dichloride, dioctyltin dichloride, phenyltin trichloride, butyltin trichloride, octyltin trichloride and the like. Furthermore, tin tetrachloride, tin tetrabromide and the like can be exemplified as the compounds expressed by formula (2).

In the case where $M^1$ represents a silicon atom, the compounds expressed by the formula (1) can be, for example, triphenylchlorosilane, trihexylchlorosilane, trioctylchlorosilane, tributylchlorosilane, trimethylchlorosilane, diphenyldichlorosilane, dihexyldichlorosilane, dioctyldichlorosilane, dibutyldichlorosilane, dimethyldichlorosilane, methyltrichlorosilane, phenyltrichlorosilane, hexyltrichlorosilane, octyltrichlorosilane, butyltrichlorosilane, methyltrichlorosilane and the like. Furthermore, silicon tetrachloride, silicon tetrabromide and the like can be exemplified as the compounds expressed by the formula (2). In the case where $M^1$ represents a germanium atom, the compounds expressed by the formula (1) can be, for example, triphenylgermanium chloride, dibutylgermanium dichloride, diphenylgermanium dichloride, butylgermanium trichloride and the like. Furthermore, germanium tetrachloride, germanium tetrabromide and the like can be exemplified as the compounds expressed by the formula (2). Phosphorous trichloride, phosphorous tribromide and the like can be exemplified as the compounds expressed by the formula (3). In one or more embodiments, mixtures of metal halides and/or metalloid halides can be used.

In one or more embodiments, useful alkoxysilanes or alkoxystannanes may be selected from the group comprising compounds expressed by the formula (1) $R^1_n M^1 (OR)_{4-n}$, where $R^1$ is the same or different and represents a monovalent organic group with carbon number of 1 to about 20, $M^1$ represents a tin atom, silicon atom, or germanium atom, OR represents an alkoxy group where R represents a monovalent organic group, and n represents an integer of 0-3.

Exemplary compounds expressed by the formula (4) include tetraethyl orthosilicate, tetramethyl orthosilicate, tetrapropyl orthosilicate, tetraethoxy tin, tetramethoxy tin, and tetrapropoxy tin.

In one embodiment, the functionalizing agent may be added to the living polymer cement (i.e., polymer and solvent) once a peak polymerization temperature, which is indicative of nearly complete monomer conversion, is observed. Because live ends may self-terminate, the functionalizing agent may be added within about 25 to 35 minutes of the peak polymerization temperature.

The amount of functionalizing agent employed to prepare the functionalized polymers is best described with respect to the equivalents of lithium or metal cation associated with the initiator. For example, the moles of functionalizing agent per mole of lithium may be about 0.3 to about 2, in other embodiments from about 0.6 to about 1.5, in other embodiments from about 0.7 to about 1.3, in other embodiments from about 0.8 to about 1.1, and in other embodiments from about 0.9 to about 1.0.

After formation of the polymer, a processing aid and other optional additives such as oil can be added to the polymer cement. The polymer and other optional ingredients may then be isolated from the solvent and optionally dried. Conventional procedures for desolventization and drying may be employed. In one embodiment, the polymer may be isolated from the solvent by steam desolventization or hot water coagulation of the solvent followed by filtration. Residual solvent may be removed by using conventional drying techniques such as oven drying or drum drying. Alternatively, the cement may be directly drum dried.

The initiator employed in certain processes of the present invention includes sulfur-containing initiators. These initiators may be defined by the formula

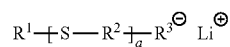

where $R^1$ is a monovalent organic group, $R^2$ is a divalent organic group, $R^3$ is a divalent organic group or a bond, and a is an integer from 1 to about 5. The monovalent and divalent organic groups are the same as defined above.

In certain embodiments, the initiators may be defined by the formula

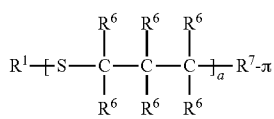

where $R^1$ is a monovalent organic group, each $R^6$ is independently hydrogen or a monovalent organic group, a is an integer from 1 to about 5, and $R^7$ is the oligomerization product of diene and optionally monomer copolymerizable therewith.

The initiators of one or more embodiments are advantageously soluble in organic solvents, and therefore technologically useful initiator solutions can be prepared. The solvents in which the initiators are soluble include both polar and non-polar solvents. Types of non-polar solvents include aliphatic, cycloaliphatic, and aromatic solvents. Exemplary aliphatic solvents include n-pentane, n-hexane, n-heptane, n-octane, n-nonane, n-decane, isopentane, isohexanes, isoheptanes, isooctanes, 2,2-dimethylbutane, petroleum ether, kerosene, petroleum spirits, and mixtures thereof. Some representative examples of suitable cycloaliphatic solvents include cyclopentane, cyclohexane, methylcyclopentane, methylcyclohexane, and mixtures thereof. Mixtures of aliphatic and cycloaliphatic solvents may be employed. Examples of aromatic solvents include benzenes, xylenes, toluene, and mixtures thereof. Useful polar solvents include ethers. Exemplary polar solvents include tetrahydrofuran (THF), tetrahydropyran, diglyme, 1,2-dimethoxyethene, 1,6-dimethoxyhexane, 1,3-dioxane, 1,4-dioxane, anisole, ethoxybenzene, and mixtures thereof.

In one or more embodiments, initiator solutions within aliphatic solvents can be prepared at technologically useful concentrations. For example, solutions including from about 0.1 to about 1.6 molar, in other embodiments from about 0.2 to about 1.3 molar, and in other embodiments from about 0.5 to about 1.0 molar initiator in aliphatic solvent can be prepared.

In certain embodiments, the sulfur-containing initiator employed in one or more embodiments of the present invention can be prepared by introducing an organolithium compound with a cyclic sulfur-containing compound and allowing these compounds to react to form a precursor compound. In one or more embodiments, the molar ratio of the organolithium compound that is introduced with the cyclic sulfur-containing compound can be less than 1:5, in other embodiments less than 1:3, in these or other embodiments greater than 1:0.8, and in other embodiments about 1:1.

The precursor compound is then introduced to at least one mole of conjugated diene monomer per equivalent of lithium and allowed to react with the conjugated diene monomer to form a sulfur-containing anionic polymerization initiator. In these or other embodiments, the precursor compound is introduced to 1 to about 10 moles, in other embodiments from about 1 to about 5 moles, and in other embodiments from about 1 to about 3 moles of conjugated diene monomer per equivalent of lithium and allowed to react to form a sulfur-containing anionic polymerization initiator.

In one or more embodiments, the introduction of the organolithium compound and the cyclic sulfur-containing compound (together with the reaction of these compounds) occurs at a temperature below 0° C. In these or other embodiments, the temperature at which the organolithium compound and the cyclic sulfur-containing compound are introduced is below −20° C., in other embodiments below −40° C., in other embodiments below −60° C., and in other embodiments below −75° C.

Likewise, the temperature at which the precursor compound and the at least one mole of conjugated diene monomer are introduced is below 0° C. In these or other embodiments, the temperature at which the precursor compound and the at least one mole of conjugated diene monomer is introduced is below −20° C., in other embodiments below −40° C., in other embodiments below −60° C., and in other embodiments below −75° C. In one or more embodiments, the precursor compound and the at least one conjugated diene monomer are introduced prior to allowing the temperature of the medium in which the precursor compound exists to increase above 0° C., in other embodiments above −20° C., in other embodiments above −40° C., in other embodiments −60° C., and in other embodiments above −75° C. In these or other embodiments, once the precursor compound and at least one mole of conjugated diene monomer are introduced, the temperature of the medium in which the compounds are introduced may be increased or allowed to increase above 0° C.

The cyclic sulfur-containing compound employed in one or more embodiments of the present invention may be defined by the formula

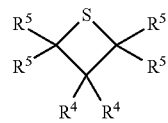

where each $R^4$ and $R^5$ are independently hydrogen or a monovalent organic group. In one or more embodiments, each $R^5$ is hydrogen and each $R^4$ is independently hydrogen or a monovalent organic group. In certain embodiments, where one or more $R^4$ groups include a monovalent organic group, the monovalent organic group is an alkyl group including from 1 to 4 carbon atoms, in other embodiments from 1 to 3 carbon atoms, and in other embodiments from 1 to 2 carbon atoms. In certain embodiments, each $R^4$ and $R^5$ are hydrogen atoms.

Examples of cyclic sulfur-containing compounds include trimethylene sulfide (thietane), 3-methylthietane, 3,3-dimethylthietane, 3-ethylthietane, 3,3-diethylthietane, 3-propylthietane, and 3,3-dipropylthietane.

In one or more embodiments, the organolithium compound may be defined by the formula $R^1$—Li, where $R^1$ is a monovalent organic group. In these or other embodiments, $R^1$ includes an alkyl group, and in certain embodiments an alkyl group including from 3 to 5, and in other embodiments 4 carbon atoms. In one or more embodiments, $R^1$ includes an n-butyl group, in other embodiments a sec-butyl group, and in other embodiments t-butyl group. Accordingly, exemplary organolithium compounds include methyllithium, ethyllithium, n-butyllithium, t-butyllithium, sec-butyllithium, and aryllithium. In other embodiments, $R^1$ includes an aryl group including from 6 to 12 carbon atoms, and in other embodiments from 6 to 8 carbon atoms. Accordingly, other exemplary organolithium compounds include aryllithium.

The introduction of organolithium compound and cyclic sulfur-containing compound (e.g., thietane), as well as the subsequent reaction with at least one mole of conjugated diene monomer per equivalent of lithium, may take place within a solvent, which forms a reaction medium in which the precursor compound is soluble. The solvent may include organic solvents such as polar and non-polar solvents. In particular embodiments, the solvent includes a polar solvent such as THF. The concentration of the organolithium compound and cyclic sulfur-containing compound, as well as the precursor compound, within the solvent may be from about 0.01 to about 1.8 molar, in other embodiments from about 0.1 to about 1.6 molar, and in other embodiments from about 0.2 to about 1.0 molar.

The sulfur-containing initiators of one or more embodiments of the present invention are advantageously stable within an organic solvent and can therefore be stored prior to use as an initiator to polymerize monomer such as conjugated diene monomer. In one or more embodiments, stable solutions include those solutions where the initiator activity is maintained at least at 80%, in other embodiments at least at 90%, and in other embodiments at least at 95% for a period of one week at 20° C.

In other embodiments, the functional polymers of the present invention may be prepared by an alternate method. According to this method, an organolithium compound and a cyclic sulfur-containing compound (e.g., thietane) are introduced and allowed to react as provided above. This reaction takes place at temperatures and within solvent as provided above (e.g., below 0° C. within THF). The reaction product (i.e., the precursor compound) between the organolithium compound and the cyclic sulfur-containing compound is introduced to monomer to be polymerized. For example, the precursor compound is introduced to more than 10 moles of conjugated diene monomer per equivalent of lithium as provided in the previous embodiment.

The amount of monomer introduced to the precursor compound may vary based upon the polymerization system employed. For example, when a batch polymerization process is employed, all of the monomer to be polymerized is introduced to the precursor compound. Where semi-batch or continuous processes are employed, additional monomer may be introduced to the living polymer following the initial introduction of precursor compound and monomer.

In one or more embodiments, the precursor compound is optionally allowed to warm (or is heated) to temperatures above 0° C., in other embodiments to temperatures from about 0° C. to about −78° C., in other embodiments from about −5° C. to about −50° C., and in other embodiments from about −1° C. to about −25° C. prior to introducing the precursor to the monomer to be polymerized. In these or other embodiments, the precursor compound is introduced to the monomer to be polymerized within 24 hours, in other embodiments within 12 hours, in other embodiments within 6 hours, in other embodiments within 3 hours, in other embodiments within 1 hour, and in other embodiments within 15 minutes of the formation of the precursor compound. In other embodiments, the precursor compound is introduced to the monomer prior to any warming of the precursor compound, or warming to temperatures below 0° C.

The introduction of the precursor compound to the monomer may occur within a solvent. The solvent may include organic solvents such as polar and non-polar solvents. In one or more embodiments, the introduction takes place within a reactor wherein the reactants, as well as other optional constituents such as modifiers, are dissolved or suspended within a solvent. In one or more embodiments, the monomer to be polymerized is dissolved within a solvent, and the precursor compound is introduced to this mixture of monomer and solvent. The concentration of the monomer within the solvent prior to introduction of the precursor compound may be from about 5 to about 50 weight percent, in other embodiments from about 8 to about 35 weight percent, and in other embodiments from about 10 to about 25 weight percent. The temperature of the monomer/solvent mixture at the time that the precursor compound is introduced may be from about −78° C. to about 80° C., in other embodiments from about 0° C. to about 60° C., and in other embodiments from about 10° C. to about 50° C.

In other embodiments, the precursor compound and the monomer are introduced at lower temperatures to form a reaction medium, and after introduction, the reaction medium is heated or allowed to warm to temperatures such as 20° C. to about 100° C., in other embodiments from about 40° C. to about 90° C., and in other embodiments from about 60° C. to about 80° C.

In one or more embodiments, at the time of introduction to the monomer, the precursor compound may be at least partially dissolved in a solvent. The solvent may include polar and/or non-polar solvents. In one or more embodiments, at least 60 weight percent, in other embodiments at least 80 weight %, in other embodiments at least go weight %, and in other embodiments at least 99 weight % of the precursor compound is dissolved in the solvent. In these or other embodiments, the concentration of the precursor compound dissolved in the solvent may be from about 0.1 to about 1.6 molar, in other embodiments from about 0.2 to about 1.4 molar, and in other embodiments from about 0.5 to about 1.0 molar.

The functional polymers of this invention are particularly useful in preparing tire components. These tire components can be prepared by using the functional polymers of this invention alone or together with other rubbery polymers. Other rubbery polymers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. Reinforcing fillers may advantageously be used. The organic fillers include carbon black and starch. The inorganic fillers may include silica, aluminum hydroxide, magnesium hydroxide, clays (hydrated aluminum silicates), and mixtures thereof.

In one or more embodiments, silica (silicon dioxide) includes wet-process, hydrated silica produced by a chemical reaction in water, and precipitated as ultra-fine spherical particles. In one embodiment, the silica has a surface area of about 32 to about 400 $m^2/g$, in another embodiment about 100 to about 250 $m^2/g$, and in yet another embodiment, about 150 to about 220 $m^2/g$. The pH of the silica filler in one embodiment is about 5.5 to about 7 and in another embodiment about 5.5 to about 6.8. Commercially available silicas include Hi- Sil™ 215, Hi-Sil™ 233, Hi-Sil™ 255LD, and Hi-Sil™ 190 (PPG Industries; Pittsburgh, Pa.), ZeoSil™ 1165 MP and 175GRPlus (Rhodia), Vulkasil™ (Bary AG), Ultrasil™ VN$^2$, VN$_3$ (Degussa), and HuberSil™ 8745 (Huber).

In one or more embodiments, the carbon blacks may include any of the commonly available, commercially-produced carbon blacks. These include those having a surface area (EMSA) of at least 20 m$^2$/gram and in other embodiments at least 35 m$^2$/gram up to 200 m$^2$/gram or higher. Surface area values include those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks that may be utilized include acetylene blacks. Mixtures of two or more of the above blacks can be used in preparing the carbon black products of the invention. Exemplary carbon blacks include those bearing ASTM designation (D-1765-82a) N-110, N-220, N-339, N-330, N-351, N-550, and N-660. In one or more embodiments, the carbon black may include oxidized carbon black.

In one embodiment, silica may be used in an amount of from about 5 to about 100 parts by weight parts per hundred rubber (phr), in another embodiment from about 10 to about go parts by weight phr, in yet another embodiment from about 15 to about 80 parts by weight phr, and in still another embodiment from about 25 to about 75 parts by weight phr.

A multitude of rubber curing agents may be employed, including sulfur or peroxide-based curing systems. Curing agents are described in Kirk-Othmer, ENCYCLOPEDIA OF CHEMICAL TECHNOLOGY, Vol. 20, pgs. 365-468, (3$^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, (2$^{nd}$ Ed. 1989), which are incorporated herein by reference. Vulcanizing agents may be used alone or in combination. In one or more embodiments, the preparation of vulcanizable compositions and the construction and curing of the tire is not affected by the practice of this invention.

Other ingredients that may be employed include accelerators, oils, black oils (e.g., oils including low polycyclic aromatic content), waxes, scorch inhibiting agents, processing aids, zinc oxide, tackifying resins, reinforcing resins, fatty acids such as stearic acid, peptizers, and one or more additional rubbers.

These stocks are useful for forming tire components such as treads, subtreads, black sidewalls, body ply skins, bead filler, and the like. Preferably, the functional polymers are employed in tread formulations. In one or more embodiments, these tread formulations may include from about 10 to about 100% by weight, in other embodiments from about 35 to about 90% by weight, and in other embodiments from about 50 to 80% by weight of the functional polymer based on the total weight of the rubber within the formulation.

In one or more embodiments, the vulcanizable rubber composition may be prepared by forming an initial masterbatch that includes the rubber component and filler (the rubber component optionally including the functional polymer of this invention). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients including the functional polymer of this invention can be added during these remills. Rubber compounding techniques and the additives employed therein are generally known as disclosed in *The Compounding and Vulcanization of Rubber, in Rubber Technology* (2$^{nd}$ Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including the functional polymer of this invention and silica in the substantial absence of coupling and shielding agents. It is believed that this procedure will enhance the opportunity that the functional polymer will react or interact with silica before competing with coupling or shielding agents, which can be added later curing remills.

In certain embodiments, where silica filler is employed to make the rubber compositions, the compositions are prepared by mixing the functional polymer and silica in the presence of a nitrogen-containing heterocycle. The nitrogen-containing heterocycle is believed to enhance the reaction or interaction between the silica and the functional polymer.

Where the vulcanizable rubber compositions are employed in the manufacture of tires, these compositions can be processed into tire components according to ordinary tire manufacturing techniques including standard rubber shaping, molding and curing techniques. Any of the various rubber tire components can be fabricated including, but not limited to, treads, sidewalls, belt skims, and carcass. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Example 1

To a dry nitrogen purged 200 mL bottle was added 10 mL THF and 0.59 mL trimethylene sulfide. This was cooled to −78° C. and 5 mL of 1.6 M BuLi in hexanes was added with stirring. The contents were transferred to an 800 mL bottle containing 219 g of hexanes and 181 g of 22.1 wt % butadiene in hexane. This was placed in a 50° C. water bath for 3 hrs, terminated with 0.5 mL isopropanol, and coagulated in ethanol. End group analysis ($CH_2$—S) by $^1$H-NMR of Example 1 gave a calculated number average molecular weight ($M_n$) of ~4.0 kg/mol.

Example 2

A similar procedure to Example 1 was used except 6.2 mL of a solution prepared from 10 mL THF and 0.11 mL trimethylene sulfide was reacted with 0.92 mL of 1.6 M BuLi, and then the contents were warmed and introduced to the butadiene as provided in Example 1.

Example 3

A similar procedure to Example 2 was used except 3.1 mL of a solution prepared from 10 mL THF and 0.11 mL trimethylene sulfide was reacted with 0.92 mL of 1.6 M BuLi and then the contents were warmed and introduced to the butadiene as provided in Example 1.

Table I provides the characteristics of the polymers prepared in Examples 1-3.

TABLE I

| Example Number | Target $M_n$ (kg/mol) | GPC $M_n$ (kg/mol) | PDI | Conversion (%) |
|---|---|---|---|---|
| 1 | 5 | 5.9 | 1.06 | >95 |
| 2 | 50 | 43.9 | 1.03 | 95.8 |
| 3 | 100 | 90.1 | 1.04 | 94.5 |

Unless otherwise specified, molecular weight was determined by using standard GPC analysis with a universal calibration using polystyrene standards and adjustments for the Mark-Houwink constants for the polymer in question. Glass transition temperature ($T_g$) was determined by differential scanning calorimetry.

Example 4

To a 19 L reactor equipped with turbine agitator blades was added 4.93 kg hexane, 1.20 kg 32.8 wt % styrene in hexane, and 7.41 kg 22.2 wt % butadiene in hexane. To the reactor was charged 32.94 mL of 0.56 M 3-butylthiopropyl lithium in hexane and 2.32 mL of 1.6 M 2,2'-di(tetrahydrofuryl)propane in hexane, and the batch temperature was controlled at 49° C. After approximately 1 hour, the batch was cooled to 32° C. and a measured amount of live poly(styrene-co-butadiene) cement was then transferred to a sealed nitrogen purged 32 oz bottle. The bottle contents were then terminated with isopropanol, coagulated and drum dried. The isolated polymer had the following properties: $M_n$=105.6 kg/mol, polydispersity (PDI; $M_w/M_n$)=1.06, where $M_w$ is the weight average molecular weight; mid-point glass transition temperature ($T_g$)=−39.7° C.

Example 5-8

Additional bottles of cement were transferred from the 19 L reactor used in Example 4, and to this was added 1 mole of either N,N-dimethylimidazolidinone(DMI) [Example 5], tetraethylorthosilicate (TEOS) [Example 6], 2-methylthiothiazoline [Example 7], or 0.25 mole of tin tetrachloride (TFC) [Example 8] per mole butyl lithium. The bottles were heated to 50° C. for 30 minutes. The bottle contents were then coagulated and drum dried. Table II provides the characteristics of the polymers prepared in Examples 5-8.

TABLE II

| Example Number | Terminator | $M_n$ (kg/mol) | PDI | Coupling (%) |
|---|---|---|---|---|
| 5 | DMI | — | — | 10.4 |
| 6 | TEOS | 231.0 | 1.67 | 82.6 |
| 7 | 2-methylthiothiazoline | 112.6 | 1.15 | 12.8 |
| 8 | TTC | 245.8 | 1.28 | 85.3 |

Tread Formulations 4A-8A

The functional polymers prepared in Examples 4-8 above were each employed to prepare separate tire formulations that included a silica and carbon black blend reinforcement. The recipe for the tire formulations is set forth in Table III.

TABLE III

| Ingredient | Mixed Silica Formulation (phr) |
|---|---|
| Functionalized Polymer | 100 |
| Carbon Black | 35 |
| Silica | 30 |
| Antioxidant | 0.95 |
| Stearic Acid | 1.5 |
| Oil | 10 |
| Coupling Agent/Wax | 4.57 |
| Binder | 0.8 |
| Sulfur | 1.7 |
| Zinc Oxide | 2.5 |
| Accelerators | 2.0 |
| Scorch Inhibitor | 0.25 |

The tire formulations were mixed using conventional carbon black/silica formulation mixing procedures. Namely, the ingredients (excluding sulfur, accelerators, binder, coupling agents, and wax) were mixed to a drop temperature of about 165° C. Then, the coupling agent was subsequently added and mixed to a drop temperature of about 145° C. Then, the sulfur, accelerators, and wax were added in a subsequent mixing step and mixed to a drop temperature of about 95° C.

The formulations were then prepared into test specimens and cured within a closed cavity mold under pressure for 15 minutes at 171° C. The test specimens were then subjected to various physical tests, and the results of these tests are reported in Table IV as Formulations 4A-8A.

TABLE IV

| | Mixed Silica Tread Formulations | | | | |
|---|---|---|---|---|---|
| | 4A | 5A | 6A | 7A | 8A |
| Surfanalyzer Macrodispersion (Dispersion Index) | 84.8 | 63.2 | 85.3 | 86.3 | 71.8 |
| $ML_{1+4}$ @ 130° C. | 30.2 | 69.9 | 85.1 | 37.8 | 48.8 |

TABLE IV-continued

|  | Mixed Silica Tread Formulations | | | | |
|---|---|---|---|---|---|
|  | 4A | 5A | 6A | 7A | 8A |
| 300% Modulus @ 23° C. (MPa) | 13.3 | — | 17.6 | 13.4 | 15.6 |
| Tensile Strength @ 23° C. (MPa) | 17.5 | 18.1 | 21.1 | 15.9 | 18.5 |
| Temperature Sweep 0° C. tan* | 0.2961 | 0.2852 | 0.2965 | 0.2904 | 0.2955 |
| Temperature Sweep 50° C. tan* | 0.2306 | 0.1774 | 0.1595 | 0.2245 | 0.1966 |
| )GN (MPa) | 6.634 | 1.846 | 2.133 | 5.419 | 2.798 |
| G' (MPa) | 4.739 | 3.427 | 3.568 | 4.757 | 3.919 |
| tan δ 5% strain sweep 50° C. | 0.2286 | 0.1411 | 0.1395 | 0.2053 | 0.1583 |
| Bound Rubber (%) | 20.7 | 28.4 | 61.4 | 28.2 | 36.9 |
| Dynastat tan δ 50° C. | 0.2065 | 0.1309 | 0.1318 | 0.1883 | 0.1388 |

Mooney viscosity measurement was conducted at 130° C. using a large rotor. The Mooney viscosity was recorded as the torque when the rotor has rotated for 4 minutes. The sample is preheated at 130° C. for 1 minute before the rotor starts.

The bound rubber content test was used to determine the percent of polymer bound to filler particles in tire tread stocks. Bound rubber was measured by immersing small pieces of uncured stocks in a large excess of toluene for three days. The soluble rubber was extracted from the sample by the solvent. After three days, any excess toluene was drained off and the sample was air dried and then dried in an oven at approximately 100° C. to a constant weight. The remaining pieces form a weak coherent gel containing the filler and some of the original rubber. The amount of rubber remaining with the filler is the bound rubber. The bound rubber content is then calculated according to the following:

$$\% \text{ Bound Polymer} = \frac{100(W_d - F)}{R} \quad (1)$$

where $W_d$ is the weight of dried gel, F is the weight of filler in gel or solvent insoluble matter (same as weight of filler in original sample), and R is the weight of polymer in original sample. The dispersion index (DI) was determined by using a Surfanalyzer according to ASTM D2663-95a, part c.

The tensile mechanical properties were measured using the standard procedure described in the ASTM-D 412 at 25° C. and 100° C. The tensile test specimens had dumbbell shapes with a thickness of 1.9 mm. A specific gauge length of 25.4 mm is used for the tensile test. Heat aged data was obtained after heating the vulcanizates for 24 hours at 100° C.

Temperature sweep experiments were conducted with a frequency of 10 Hz using 0.5% strain for temperature ranging from −100° C. to −10° C., and 2% strain for the temperature ranging from −10° C. to 100° C. G' is the storage modulus measured at 10 Hz and 5% strain at 50° C. Payne Effect OGN) was estimated from the change in GN obtained from the strain sweep analysis conducted at a frequency of 1 Hz at 50° C. with strain sweeping from 0.25% to 14.75% using a Rheometric Dynamic Analyzer (RDA).

Tread Formulations 4B-8B

The functionalized polymers prepared in Examples 4-8 above were each employed to prepare separate tire formulations that included a carbon black reinforcement. The recipe for the tire formulations are is forth in Table V.

TABLE V

| Ingredient | Carbon Black Formulation (phr) |
|---|---|
| Functionalized Polymer | 100 |
| Carbon Black | 55 |
| Wax | 1 |
| Antioxidant | 0.95 |
| Stearic Acid | 2.0 |
| Oil | 10 |
| Zinc Oxide | 2.5 |
| Sulfur | 1.3 |
| Accelerators | 1.9 |

The tire formulations were mixed using conventional carbon black formulation mixing procedures. Namely, the ingredients (excluding sulfur, accelerators) were mixed to a drop temperature of about 165° C. Then, the sulfur, and accelerators were added in a subsequent mixing step and mixed to a drop temperature of about 100° C.

The formulations were then prepared into test specimens and cured within a closed cavity mold under pressure for 15 minutes at 171° C. The test specimens were then subjected to various physical tests, and the results of these tests are reported in Table VI as Formulations 4B-8B.

TABLE VI

|  | Carbon Black Tread Formulations | | | | |
|---|---|---|---|---|---|
|  | 4B | 5B | 6B | 7B | 8B |
| Surfanalyzer Macrodispersion (Dispersion Index) | 97.4 | 96.8 | 97.5 | 94.1 | 97.6 |
| ML$_{1+4}$ @ 130° C. | 22.4 | 35.6 | 67.5 | 33.5 | 42.1 |
| 300% Modulus @ 23° C. (MPa) | 10.7 | — | 12.8 | 13.4 | 14.0 |
| Tensile Strength @ 23° C. (MPa) | 17.6 | 16.7 | 20.5 | 19.5 | 20.0 |
| Temperature Sweep 0° C. tan* | 0.3128 | 0.2880 | 0.3070 | 0.3007 | 0.2967 |
| Temperature Sweep 50° C. tan* | 0.2549 | 0.1605 | 0.1947 | 0.1722 | 0.1736 |
| )GN (MPa) | 4.785 | 0.416 | 2.651 | 0.694 | 0.736 |
| G' (MPa) | 3.419 | 2.228 | 3.097 | 2.366 | 2.383 |

TABLE VI-continued

|  | Carbon Black Tread Formulations | | | | |
| --- | --- | --- | --- | --- | --- |
|  | 4B | 5B | 6B | 7B | 8B |
| tan δ 5% strain sweep 50° C. | 0.2475 | 0.1014 | 0.1778 | 0.1154 | 0.1197 |
| Bound Rubber (%) | 11.3 | 36.8 | 39.6 | 34.2 | 33.7 |
| Dynastat tan δ 50° C. | 0.2345 | 0.1001 | 0.1667 | 0.1118 | 0.1140 |

Example 9

To a nitrogen-purged bottle was added 0.28 mL trimethylene sulfide (0.371 mmol) and 10 mL THF, and the mixture was then cooled to −78° C. To this was added 2.44 mL of 1.6M n-BuLi in hexanes, and the mixture was allowed to react for 15 minutes. Then, 2 mL of 21.0 wt % butadiene in hexanes was added to the bottle with stirring while the contents were maintained at about −78° C. The initiator solution was allowed to warm to room temperature for 15 minutes.

Example 10

To an 8 L reactor was added 1.53 kg of hexanes and 0.23 mL of 1.6 M 2,2'-di(tetrahydrofuryl)propane in hexanes and heated to 85° C. A solution of 2.18 kg of 21.0 wt % butadiene in hexanes and 0.75 kg of 33 wt % styrene in hexanes was metered into the reactor at a rate of 22 grams/minute. After 5 minutes of metering, the initiator solution prepared in Example 9 was added to the reactor. Metering of the butadiene and styrene contained at the specified rate for an additional 115 minutes. Ten minutes after the metering was complete, 3.91 mL of 1.0 M N,N-dimethylimidazolidinone was added to the reactor. The cement was then discharged into isopropanol containing BHT. The resulting polymer had the following properties: $M_n$ 181.0 kg/mol, PDI 1.24, $T_g$ −28.2° C., % Styrene 37.6, % Block Styrene 2.3%, % vinyl 30.9%.

Example 11

Following the same procedure set forth in Examples 9 and 10 but eliminating the butadiene addition in the initiator synthesis of Example 9, no polymerization was observed when the initiator was introduced into monomer as in Example 10. Note that in Example 1, the initiator solution was not allowed to warm to room temperature prior to introducing the monomer to be polymerized. In Examples 9 and 10, diene chain extension was used to stabilize the initiator, which was then warmed to room temperature before introducing it to the monomer to be polymerized.

Various modifications and alterations that do not depart from the scope and spirit of this invention will become apparent to those skilled in the art. This invention is not to be duly limited to the illustrative embodiments set forth herein.

What is claimed is:

1. A method for forming a polymer including a sulfur-containing functional group, the method comprising:
   introducing a sulfur-containing initiator defined by the formula

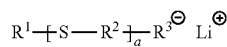

with conjugated diene monomer and optionally copolymerizable monomer within a polymerization medium and allowing the sulfur-containing initiator to initiate the polymerization of the conjugated diene monomer and the optional copolymerizable monomer, where $R^1$ is a monovalent organic group, $R^2$ is a divalent organic group, $R^3$ is a divalent organic group or a bond, and a is an integer from 1 to about 5.

2. The method of claim 1, where the sulfur-containing initiator is prepared by (i) introducing an organolithium compound with a cyclic sulfur-containing compound defined by the formula

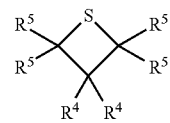

within a reaction medium at a temperature below 0° C. and allowing the organolithium and cyclic sulfur-containing compound to react and form a precursor compound, where each $R^4$ and $R^5$ are independently hydrogen or a monovalent organic group, and (ii) introducing the precursor with at least one mole of a conjugated diene monomer prior to allowing the temperature of the reaction medium to increase above 0° C. and allowing the precursor compound to react with the conjugated diene monomer to form a sulfur-containing anionic polymerization initiator.

3. The method of claim 1, where $R^1$ is an alkyl group including from 1 to about 10 carbon atoms or an aryl group including from 6 to 12 carbon atoms.

4. The method of claim 1, where $R^3$ is the oligomerization product of from 1 to about 5 moles of conjugated diene monomer.

5. The method of claim 2, where said organolithium compound and said cyclic sulfur-containing compound are introduced at a temperature below −40° C.

6. The method of claim 2, where said organolithium compound and said cyclic sulfur-containing compound are introduced at a temperature below −75° C.

7. The method of claim 2, where said organolithium compound is selected from the group consisting of methyllithium, ethyllithium, n-butyllithium, t-butyllithium, sec-butyllithium, aryllithium, and mixtures thereof.

8. The method of claim 2, where said cyclic sulfur-containing compound is selected from the group consisting of thietane, 3-methylthietane, 3,3-dimethylthietane, 3-ethylthietane, 3,3-diethylthietane, 3-propylthietane, and 3,3-dipropyllthietane.

9. The method of claim 1, where the conjugated diene monomer is selected from the group consisting of 1,3-butadiene, isoprene, 1,3-pentadiene, 2,3-dimethyl-1,3-butadiene, 1,3-hexadiene, and mixtures thereof and where the copolymerizable monomer is selected from the group consisting of styrene, α-methyl styrene, p-methylstyrene, vinylnaphthalene, and mixtures thereof.

10. The method of claim 1, where said step of introducing takes place in the presence of a solvent.

11. The method of claim 1, wherein said polymerization medium is heated to a temperature of from about 20° C. to about 130° C.

12. The method of claim 2, where said step of introducing the precursor with at least one mole of conjugated diene monomer occurs at a temperature below −40° C.

13. The method of claim 2, where said step of introducing the precursor with at least one mole of conjugated diene monomer occurs at a temperature below −75° C.

14. The method of claim 1, where said step of introducing a sulfur-containing initiator with conjugated diene monomer results in a living polymer, and where said living polymer is terminated with a compound that will impart a functional group at the terminus of the polymer.

15. The method of claim 1, where the initiator is defined by the formula

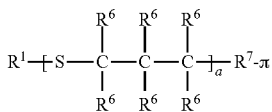

where $R^1$ is a monovalent organic group, each $R^6$ is independently hydrogen or a monovalent organic group, a is an integer from 1 to about 5, and $R^7$ is the oligomerization product of diene and optionally monomer copolymerizable therewith.

16. The method of claim 1, where $R^2$ is a linear propylene or substituted propylene, and where $R^3$ is the oligomerization product of diene and optionally monomer copolymerizable therewith.

17. A method for preparing a polymer including a sulfur-containing functional group, the method comprising:
   (i) introducing an organolithium compound with a cyclic sulfur-containing compound defined by the formula

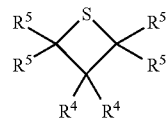

within a reaction medium at a temperature below 0° C. and allowing the organolithium and cyclic sulfur-containing compound to react and form a precursor compound, where each $R^4$ and $R^5$ are independently hydrogen or a monovalent organic group, and
   (ii) introducing the precursor compound to monomer to be polymerized.

18. A method for preparing a sulfur-containing anionic polymerization initiator, the method comprising:
   (i) introducing an organolithium compound with a cyclic sulfur-containing compound defined by the formula

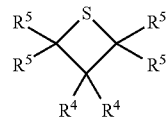

within a reaction medium at a temperature below 0° C. and allowing the organolithium and cyclic sulfur-containing compound to react and form a precursor compound, where each $R^4$ and $R^5$ are independently hydrogen or a monovalent organic group, and
   (ii) introducing the precursor with at least one mole of a conjugated diene monomer prior to allowing the temperature of the reaction medium to increase above 0° C. and allowing the precursor compound to react with the conjugated diene monomer to form a sulfur-containing anionic polymerization initiator.

* * * * *